(12) United States Patent
Kim

(10) Patent No.: US 10,770,740 B2
(45) Date of Patent: Sep. 8, 2020

(54) METHOD OF SHUTTING DOWN OPERATION OF FUEL CELL VEHICLE

(71) Applicants: HYUNDAI MOTOR COMPANY, Seoul (KR); KIA MOTORS CORPORATION, Seoul (KR)

(72) Inventor: Dae Jong Kim, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 149 days.

(21) Appl. No.: 16/032,296

(22) Filed: Jul. 11, 2018

(65) Prior Publication Data

US 2019/0288315 A1 Sep. 19, 2019

(30) Foreign Application Priority Data

Mar. 14, 2018 (KR) .................. 10-2018-0029677

(51) Int. Cl.

| H01M 8/04955 | (2016.01) |
|---|---|
| H01M 8/04303 | (2016.01) |
| H01M 8/04746 | (2016.01) |
| H01M 8/04858 | (2016.01) |
| B60L 3/04 | (2006.01) |
| H02J 7/34 | (2006.01) |
| H01M 10/44 | (2006.01) |
| B60L 58/40 | (2019.01) |

(52) U.S. Cl.
CPC .......... *H01M 8/04955* (2013.01); *B60L 3/04* (2013.01); *B60L 58/40* (2019.02); *H01M 8/0488* (2013.01); *H01M 8/04303* (2016.02); *H01M 8/04753* (2013.01); *H01M 10/44* (2013.01); *H02J 7/34* (2013.01); *B60Y 2200/91* (2013.01)

(58) Field of Classification Search
CPC ......... H01M 8/04955; H01M 8/04303; H01M 8/04753; H01M 8/0488; B60L 58/40; B60L 3/04; B60W 10/24; B60W 10/26
USPC ........................................ 180/65.29
See application file for complete search history.

(56) References Cited

U.S. PATENT DOCUMENTS

| 7,371,476 B2 * | 5/2008 | Aso ................. H01M 8/04589 429/429 |
|---|---|---|
| 8,368,350 B2 * | 2/2013 | Iwanaga ............ B60L 53/18 320/109 |
| 8,956,774 B2 * | 2/2015 | Kwon ............ H01M 8/04253 429/413 |
| 9,145,066 B2 * | 9/2015 | Takasu ............ H01M 16/006 |
| 9,299,998 B2 * | 3/2016 | Chun ............ H01M 8/04231 |
| 9,755,256 B2 * | 9/2017 | Lee ...................... H02P 4/00 |
| 9,831,515 B2 * | 11/2017 | Song ............. H01M 8/04228 |

(Continued)

FOREIGN PATENT DOCUMENTS

KR 10-1759140 B1 7/2017

*Primary Examiner* — Jeffrey J Restifo
(74) *Attorney, Agent, or Firm* — Morgan, Lewis & Bockius LLP

(57) ABSTRACT

A method of shutting down operation of a fuel cell vehicle includes: blocking, by a controller, an air supply to a fuel cell stack when an operation shutting down command of the fuel cell vehicle is applied; increasing, by the controller, a voltage at an rear end of a stack main relay connected to the fuel cell stack; and opening, by the controller, the stack main relay when the voltage at the rear end of the stack main relay is higher than a stack voltage by a predetermined voltage or more.

5 Claims, 4 Drawing Sheets

(56) References Cited

U.S. PATENT DOCUMENTS

| | | | |
|---|---|---|---|
| 10,147,960 B2* | 12/2018 | Lee | H01M 8/04955 |
| 10,158,137 B2* | 12/2018 | Kwon | H02J 7/34 |
| 10,166,884 B2* | 1/2019 | Matsumoto | B60L 11/1887 |
| 10,179,513 B2* | 1/2019 | Kwon | B60L 11/1803 |
| 10,266,067 B2* | 4/2019 | Kwon | H01M 8/04303 |
| 10,511,041 B2* | 12/2019 | Kwon | H01M 8/04395 |
| 2010/0009219 A1* | 1/2010 | Kwon | H01M 8/04567 429/432 |
| 2012/0141895 A1* | 6/2012 | Kwon | H01M 8/04037 429/429 |
| 2016/0006059 A1* | 1/2016 | Kwon | B60L 58/33 429/434 |
| 2018/0069254 A1* | 3/2018 | Lee | H01M 8/04559 |

\* cited by examiner

[FIG.2]

METHOD OF SHUTTING DOWN OPERATION OF FUEL CELL VEHICLE

CROSS REFERENCE TO RELATED APPLICATION

The present application claims priority to Korean Patent Application No. 10-2018-0029677, filed Mar. 14, 2018, the entire contents of which is incorporated herein for all purposes by this reference.

TECHNICAL FIELD

The present disclosure relates to a method of shutting down an operation of a fuel cell vehicle capable of preventing a relay from being damaged when shutting down the operation of the fuel cell vehicle, thus minimizing use of hydrogen gas and preventing delay of a shut down time.

BACKGROUND

A fuel cell vehicle receives power from two power supplying sources, namely a fuel cell stack and a high voltage battery, to operate a motor or to recover regenerative brake energy, and the fuel cell vehicle includes a stack main relay and a battery relay for connecting or blocking power provided from each power supplying source.

When a driver drives the fuel cell vehicle in a hybrid mode, the fuel cell vehicle runs while the stack main relay and the battery relay are in closed state.

However, when the driver stops driving the fuel cell vehicle, a remaining voltage of a fuel cell stack has to be completely consumed while shutting down the operation thereof. For this, the remaining voltage is forcibly consumed by opening the stack main relay while an air supply to the fuel cell is stopped, the fuel cell stack is connected to a resistor by using a resistor relay, and thus forcibly reacting remaining hydrogen gas and oxygen gas within the fuel cell stack.

Then, when the stack voltage has been consumed to some extent, an operation of a coolant pump (CSP) is stopped, an operation of a low Voltage DC/DC converter (LDC) is stopped, and then the battery relay is opened.

Herein, in order to consume the stack voltage, two relays are used for the resistor relay. The resistor relays are used for blocking a voltage being raised which is generated by reaction between atmospheric air therein and remaining hydrogen gas when the vehicle enters a power-OFF state after consuming the stack voltage, and for consuming a remaining voltage of the fuel cell stack when an emergency situation such as a collision occurs so that the controller cannot normally operate, or when one resistor relay is damaged so that normal consuming of the stack voltage is performed by automatically closing other resistor relays.

In an emergency situation such as a collision, it is a legal requirement to drop the stack voltage to less than a certain voltage level within a certain time.

However, the method of shutting down operation of the fuel cell system described as above has the following problems.

When shutting down the vehicle operation, there is high probability that the stack voltage is maintained at a high level, a high voltage DC/DC converter (HDC) keeps controlling the voltage, and the coolant pump (CSP) and the LDC are in operation.

Herein, as voltages at front and rear ends of the stack main relay are identical, and the stack main relay is in a closed state, although its value is not large, current is still generated in the stack. When the stack main relay is opened at the above situation, fusion damage of the stack main relay may be generated.

In addition, after opening the stack main relay, the resistor relay is closed for consuming the stack voltage. Herein, since a hydrogen gas supply to the stack is maintained, new hydrogen gas is continuously supplied to the stack as much as the lost hydrogen gas in response to the consumption of the voltage.

Accordingly, energy used for consuming the remaining voltage of the stack is generated to heat by the resistor, thus unnecessary hydrogen gas consumption occurs. In addition, when current is generated while hydrogen gas is insufficient within the stack, stack damage may cause.

In addition, the stack voltage is consumed to some extent by closing one resistor relay, and the closed relay is opened and then the other resistor relay is closed, at the above crossing timing, while current is still generated in the stack, thereby causing intermittent resistance relay damage.

In addition, when instantaneous inrush current that may be generated at the above crossing timing between the two relays is repeatedly occurs, fusion damage of the resistor relay may be generated by the accumulated damage.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to provide a method of shutting down operation of a fuel cell vehicle wherein relay damage caused when shutting down the vehicle operation is prevented, and loss of hydrogen gas is minimized, and delaying of a shut down time is prevented.

According to an exemplary embodiment of the present disclosure, a method of shutting down operation of a fuel cell vehicle includes: an air blocking step of blocking, by a controller, an air supply to a fuel cell stack when an operation shutting down command of the fuel cell vehicle is applied; a voltage raising step of increasing, by the controller, a voltage at an rear end of a stack main relay connected to the fuel cell stack; and a stack voltage blocking step of opening, by the controller, the stack main relay when the voltage at the rear end of the stack main relay is higher than a stack voltage by a predetermined voltage or more.

The method may further include: before the voltage raising step, a voltage dropping step of dropping the voltage at the rear end of the stack main relay in a predetermined slope when the voltage at the rear end of the stack main relay exceeds a voltage of a high voltage battery; and a charging step of charging the high voltage battery by using a remaining voltage of the fuel cell stack when dropping the voltage at the rear end of the stack main relay.

The method may further include a voltage dropping stop step of stopping of the dropping the voltage at the rear end of the stack main relay when the voltage at the rear end of the stack main relay reaches a voltage in which the voltage of the high voltage battery and a first margin voltage are added together; wherein when the stack voltage reaches a voltage in which the voltage at the rear end of the stack main relay and a second margin voltage are added together, the voltage raising step may be performed so that the voltage at the rear end of the stack main relay is controlled to be raised.

The method may further include, after the stack voltage blocking step, a remaining voltage consuming step of consuming a remaining voltage of the fuel cell stack by closing a resistor relay provided between the fuel cell stack and a resistor.

The remaining voltage consuming step may include: closing a first resistor relay provided between the fuel cell stack and the resistor; closing a second resistor relay provided between the fuel cell stack and the resistor when the stack voltage is equal to or less than a first reference voltage; and opening the first resistor relay when the stack voltage is equal to or less than a second reference voltage that is lower than the first reference voltage.

Through the above problems occurring in the related art, in the present disclosure, fusion or damage of a stack main relay can be prevented by opening the stack main relay while a voltage at an rear end of the stack main relay is controlled to be higher than the stack voltage when shutting down a system of a fuel cell vehicle, and fuel economy performance can be improved by maximally charging a high voltage battery using remaining energy of a fuel cell stack before consuming the stack remaining energy by using a resistor.

In addition, when consuming the stack remaining energy by using the resistor, by properly controlling a timing where a first resistor relay and a second resistor relay are opened/closed according to the remaining voltage of the fuel cell stack, generation of inrush current when opening or closing the first resistor relay and the second resistor relay can be prevented, and thus fusion damage of the corresponding relay can be prevented.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Description of the preferred embodiments of the present disclosure will be described in detail with reference to the accompanying drawings.

Before describing a method of shutting down operation of the present disclosure, a configuration of an electric circuit of a fuel cell vehicle to which the present disclosure may be applied will be described with reference to FIG. 1. A fuel cell stack 1 is connected to a high voltage DC/DC converter (HDC), a low voltage DC/DC converter (LDC), a motor control unit (MCU), a blower pump control unit (BPCU), a coolant pump (CSP), etc. by a high voltage stack main relay R1.

In addition, a high voltage battery 3 is connected to the HDC 5 by a battery relay R4.

In addition, a first consuming relay and a second consuming relay are connected in parallel between the fuel cell stack 1 and the resistor 7.

Figure 1:
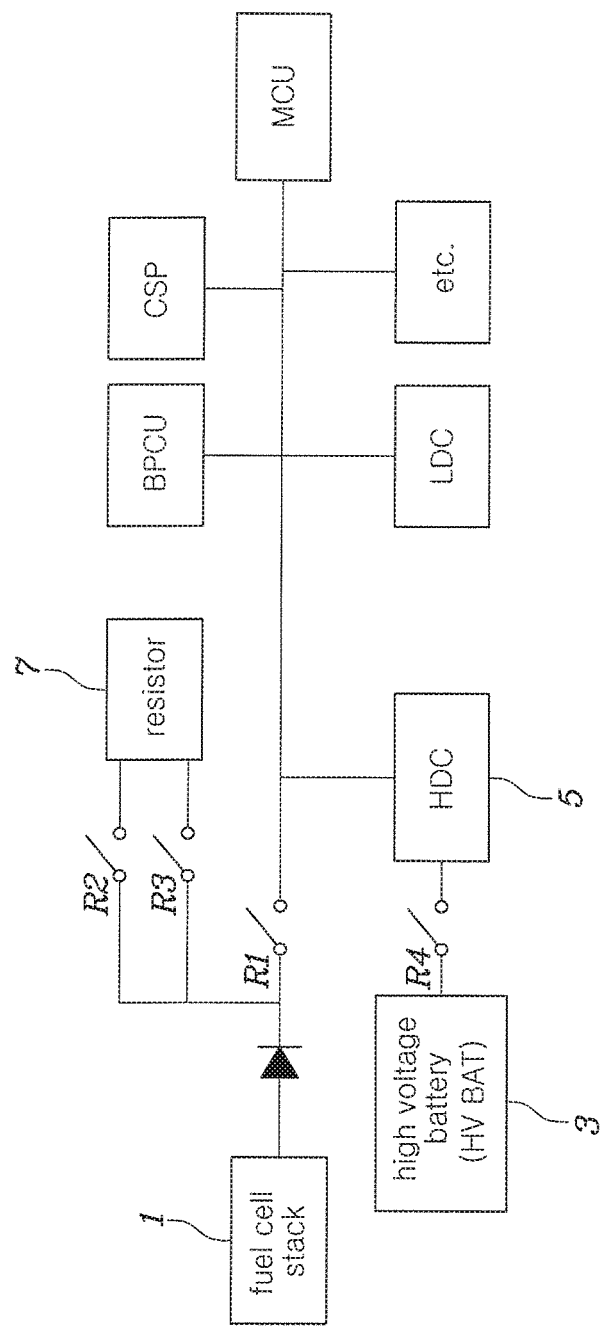
FIG. 1 is a view showing an electric circuit of a fuel cell vehicle according to an exemplary embodiment of the present disclosure.
Figure 2:
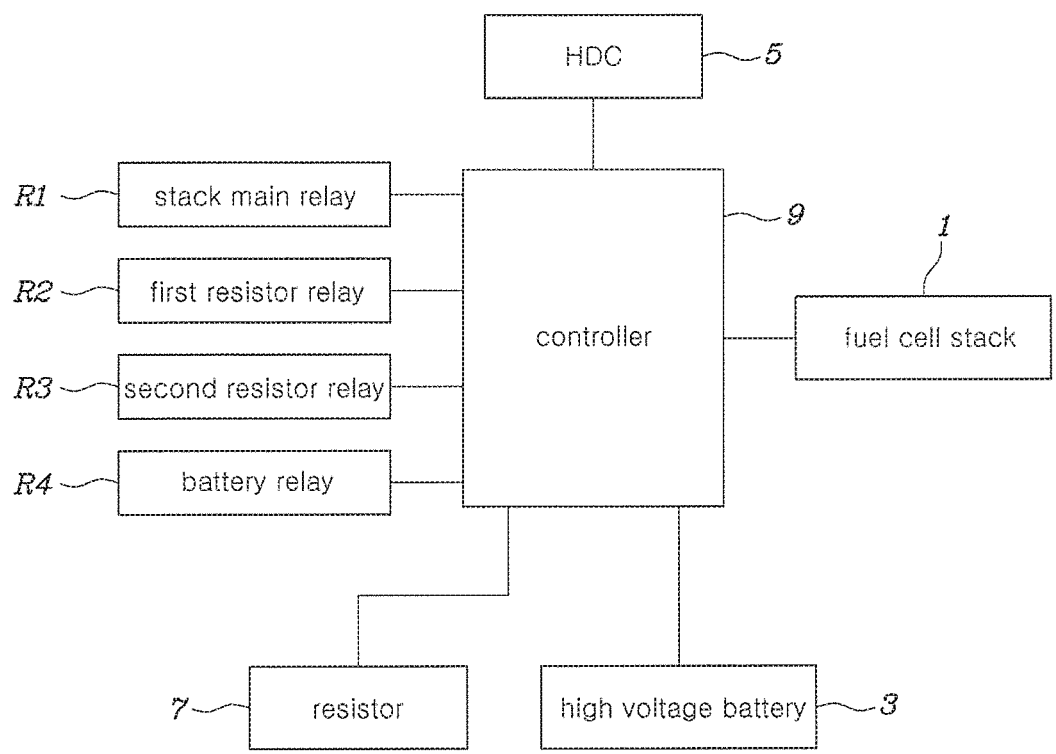
FIG. 2 is a view showing a conceptual relation between main configuration elements constituting the fuel cell vehicle according to an exemplary embodiment of the present disclosure.
Figure 3:
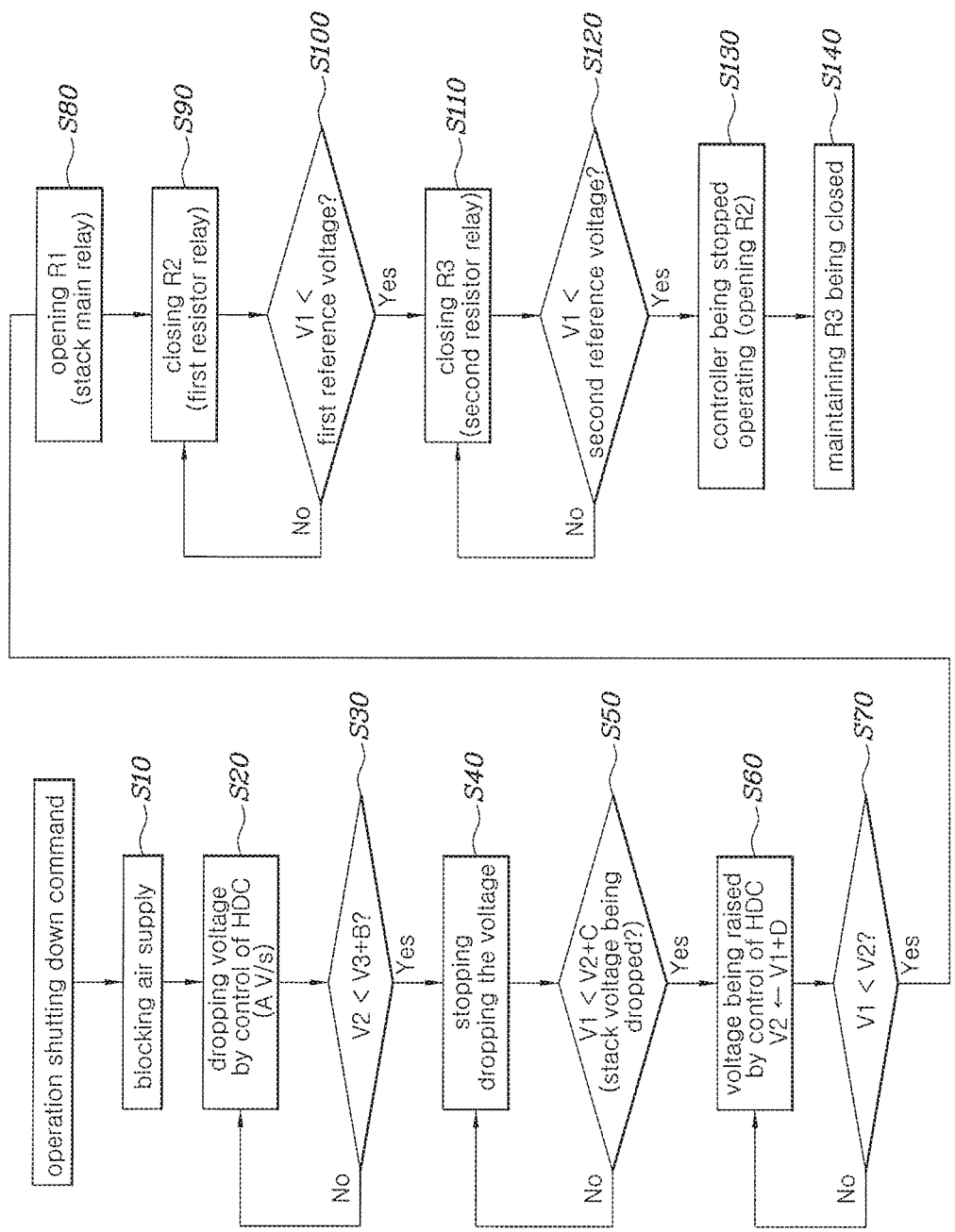
FIG. 3 is a view showing a flowchart of controlling of shutting down operation of the fuel cell vehicle according to an exemplary embodiment of the present disclosure.

A method of shutting down operation of a fuel cell vehicle according to an exemplary embodiment of the present disclosure with reference to FIGS. 1 to 3, includes first, an air supply blocking step, in which a controller 9 may block an air supply to the fuel cell stack 1 when an operation shutting down command of the fuel cell vehicle is applied.

In a voltage raising step, the controller 9 may control such that a voltage V2 at the rear end of the stack main relay R1 connected to the fuel cell stack 1 is raised.

Herein, the voltage V2 at the rear end of the stack main relay R1 may be determined by controlling to be raised or dropped by the HDC 5.

In addition, in a stack voltage blocking step, the controller 9 may control to open the stack main relay R1 when the voltage V2 at the rear end of the stack main relay R1 rises more than a stack voltage V1 by a predetermined voltage or more.

In other words, in a key-off process of the fuel cell vehicle, in case of the stack main relay R1 that passes or blocks electrical flow in the fuel cell stack 1, electrical damage of the stack main relay R1 occurs when the stack main relay R1 is opened while the electrical flow is present, and thus the electrical flow is blocked by the stack main relay R1, or the stack main relay R1 is opened when the electrical flow becomes minimum.

Accordingly, in order to prevent the stack main relay R1 from being damaged, the stack main relay R1 is opened while the electric flow between front and rear ends of the stack main relay R1 is blocked.

However, in a side of the fuel cell stack 1 which is the front end of the stack main relay R1, a diode is present, so that electric flow is not generated from the rear end to the front end of the stack main relay R1.

Accordingly, in order to block current flow from the fuel cell stack 1 to the rear end of the stack main relay R1, a situation where a voltage at the rear end of the stack main relay R1 is higher than the stack voltage V1 is generated, then the stack main relay R1 is opened at the above situation, and thus fusion and damage of the stack main relay R1 may be prevented.

In detail, when air and hydrogen gas are supplied sufficiently to the fuel cell stack 1 while the stack main relay R1 is closed, a voltage of the fuel cell stack 1 identically changes according to a voltage controlled by the HDC 5.

However, when a system for the fuel cell vehicle stops so that the air supply is also stopped, and, the HDC 5 controls the voltage V2 at the rear end of the stack main relay R1 to be dropped, the stack voltage V1 and the voltage V2 at the rear end of the stack main relay R1 identically change, but when the HDC 5 controls the voltage V2 to be raised, the stack voltage V1 and the voltage V2 at the rear end of the stack main relay R1 become different each other as the voltage V2 at the rear end of the stack main relay R1 is only raised, and becomes higher than the stack voltage V1.

In this way, when the voltage V2 at the rear end of the stack main relay R1 becomes higher than the stack voltage V1, by the voltage V2 at the rear end of the stack main relay R1 which has become higher than the stack voltage V1 while the air supply to the fuel cell stack 1 is blocked, current is not further generated in the fuel cell stack 1 and the voltage is not raised since the air supply to the fuel cell stack 1 is blocked. Although the voltage is raised, a speed thereof is significantly slow, and thus, a situation where the voltage V2 at the rear end of the stack main relay R1 becomes larger than the stack voltage V1 occurs.

Accordingly, since the stack main relay R1 is opened while the voltage V2 at the rear end of the stack main relay R1 is higher than the stack voltage V1, fusion or damage of the stack main relay R1 may be prevented.

Further, the method according to an exemplary embodiment of the present disclosure includes, before the voltage raising step, a voltage dropping step of controlling the voltage V2 at the rear end of the stack main relay R1 to be dropped in a predetermined slope when the voltage V2 at the rear end of the stack main relay R1 exceeds a voltage of the high voltage battery 3, and a charging step of charging the high voltage battery 3 with a remaining voltage of the fuel cell stack 1 while dropping the voltage V2 at the rear end of the stack main relay R1.

In other words, when the stack voltage V1 is consumed, since it is very advantageous in terms of fuel efficiency to recover remaining energy of the fuel cell stack 1 for charging the high voltage battery 3, recoverable energy is maximally recovered, and unrecoverable energy is consumed by using the resistor 7.

However, highly maintaining the stack voltage V1 about to an open circuit voltage (OCV) for a long period of time is very disadvantageous in terms of interior deterioration of the fuel cell stack 1.

Accordingly, when an operation shutting down command of a fuel cell vehicle is applied, before consuming stack remaining energy by using the resistor 7, remaining energy of the fuel cell stack 1 is maximally used for charging the high voltage battery 3, and thus fuel economy performance is improved by charging the high voltage battery 3 while the fuel cell stack 1 is not exposed to a high voltage for a long period of time.

However, when a voltage of the high voltage battery 3 becomes higher than the voltage V2 at the rear end of the stack main relay R1, charging of the high voltage battery 3 is not available, and thus recovering of stack energy by charging the high voltage battery 3 may be controlled to be recovered in a situation where the voltage V2 at the rear end of the stack main relay R1 is higher than the voltage of the high voltage battery 3.

The charging step may further include a voltage dropping stop step of controlling the voltage V2 at the rear end of the stack main relay R1 to stop dropping when the voltage V2 at the rear end of the stack main relay R1 reaches a voltage in which a voltage V3 of the high voltage battery and a margin voltage B are added together.

Herein, the margin voltage B is a safe voltage difference for blocking the voltage V2 at the rear end of the stack main relay R1 exceeding the voltage V3 of the high voltage battery, and may be provided for definitely blocking a situation where the fuel cell stack 1 is exposed to a high voltage of the high voltage battery 3 in the charging step.

Then, when the stack voltage V1 reaches the voltage in which the voltage V2 at the rear end of the stack main relay R1 and a margin voltage are added together, the voltage raising step is performed so that the voltage V2 at the rear end of the stack main relay R1 is controlled to be raised.

Herein, the margin voltage is a safe voltage difference for checking whether or not the stack voltage V1 is dropped about to the voltage V2 at the rear end of the stack main relay R1 by the HDC 5 that controls voltage dropping.

The method according to the present disclosure may further include, after the stack voltage blocking step, a voltage consuming step of consuming a remaining voltage of the fuel cell stack 1 by using a resistor relay provided between the fuel cell stack 1 and the resistor 7.

Describing in detail, the voltage consuming step may include: closing a first resistor relay R2 provided between the fuel cell stack 1 and the resistor 7; closing a second resistor relay R3 provided between the fuel cell stack 1 and the resistor 7 when the stack voltage V1 is equal to or less than a first reference voltage; and opening the first resistor relay R2 when the stack voltage V1 is equal to or less than a second reference voltage that is lower than the first reference voltage.

Herein, the first reference voltage is a value set in consideration with a remaining voltage of the fuel cell stack 1, a size of the resistor 7, and a current capacity of the second resistor relay R3, and may be determined as a value for preventing the second resistor relay R3 from being damaged when closing the second resistor relay R3, and the second reference value may be determined as a value for preventing the second resistor relay R3 from being damaged when opening the second resistor relay R3.

In addition, a normal open type relay may be applied to the first resistor relay R2 which enters an open state during a power OFF state, and a normal close type relay may be applied to the second resistor relay R3 which enters a closed state during a power OFF state.

In other words, after the stack main relay R1 enters an open state, for consuming the stack voltage V1 left after recovering by charging the high voltage battery 3 using the same, the fuel cell stack 1 is connected to the resistor 7 by closing the first resistor relay R2. Herein, since current flows in the first resistor relay R2 until the stack voltage V1 is completely consumed, when the first resistor relay R2 is opened while the stack voltage V1 remains, although there is a difference in degree, there is always a danger of damage.

Accordingly, the highest controller of the fuel cell vehicle stops operating after the stack voltage V1 is maximally dropped, and maintains an operation of the first resistor relay R2 until a time at which it stops operating.

In addition, a normal close type relay is applied to the second resistor relay R3 so that the fuel cell stack 1 is restored after the highest controller stops operating. For the same, when shutting down the fuel cell system, by controlling to operate with the first resistor relay R2, the current flowing in the first resistor relay R2 may be halved.

Accordingly, when the first resistor relay R2 is closed for consuming the stack remaining voltage, and the highest controller stops operating when the vehicle operation is completely stopped after the second resistor relay R3 is closed before the first resistor relay R2 is opened, it is controlled such that the first resistor relay R2 is opened and the second resistor relay R3 is only closed so that generation of inrush current may be prevented, and a current size when the first resistor relay R2 is opened may be minimized, and thus fusion damage of the first resistor relay R2 and the second resistor relay R3 may be minimized.

Figure 4:
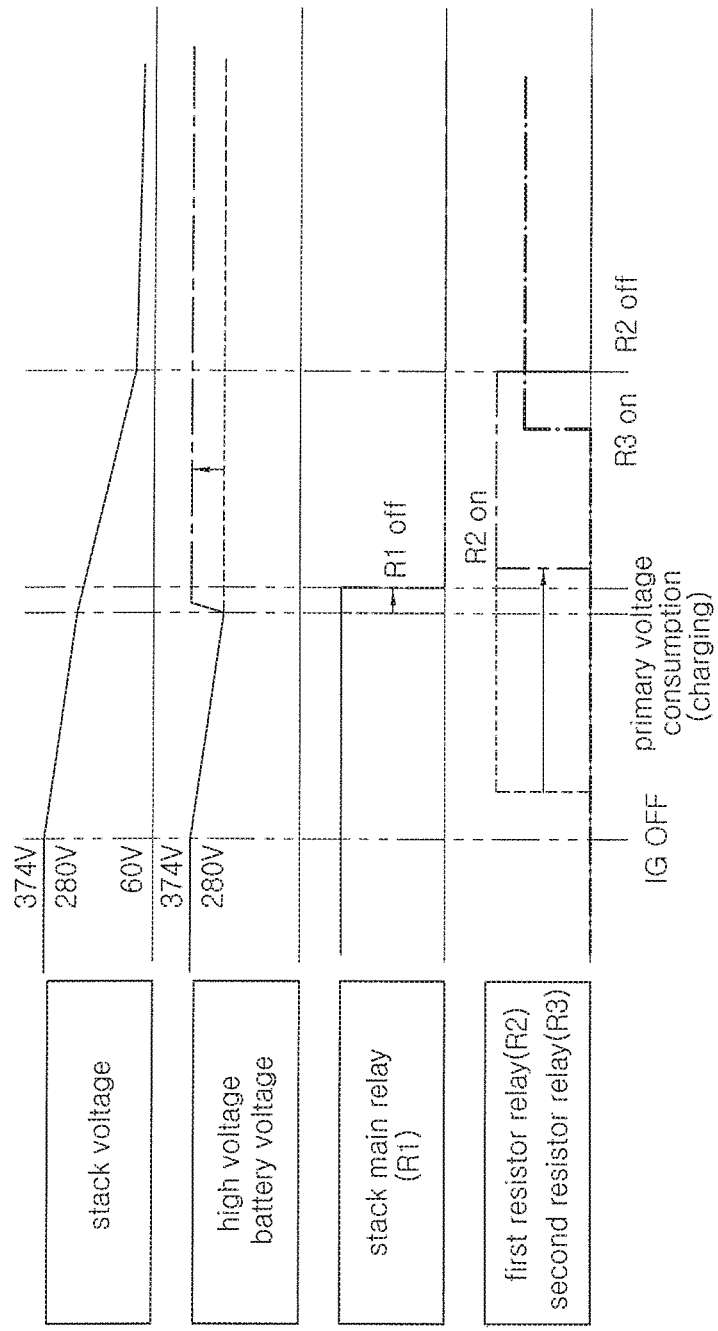
FIG. 4 is a view showing an operation order of main configuration elements when shutting down the operation of the fuel cell vehicle according to an exemplary embodiment of the present disclosure.

Referring to FIGS. 3 and 4, a process of controlling of shutting down operation of the fuel cell vehicle according to an exemplary embodiment of the present disclosure will be sequentially described. First, in step S10, when a key-off command of the fuel cell vehicle is input, an air supply to the fuel cell stack 1 is blocked.

Then, in step S20, a voltage at the rear end of the stack main, relay R1 is controlled to be dropped (A V/s) by controlling the HDC 5, and at the same time, the high voltage battery 3 is charged by using remaining energy of the fuel cell stack 1.

In the above charging process, in step S30, a voltage V2 at rear end of the stack main relay R1 and a voltage V3 of the high voltage battery 3 are compared, and, the voltage V3 of the high voltage battery 3 is charged until the a voltage in which the voltage V3 of the high voltage battery and a margin voltage B are added together exceeds the voltage V2 at rear end of the stack main relay R1, and when exceeding, in step S40, stops controlling of dropping the voltage V2 at rear end of the stack main relay R1 by controlling the HDC 5.

Then, in step S50, a stack voltage V1 and the voltage V2 at rear end of the stack main relay R1 are compared, and when a voltage in which the voltage V2 at rear end of the stack main relay R1 and a margin voltage C are added together exceeds the stack voltage V1, in step S60, the voltage V2 at rear end of the stack main relay R1 is controlled to be raised by controlling the HDC 5.

Then, in step S70, when it is determined that the voltage V2 at rear end of the stack main relay R1 has been raised more than the stack voltage V1 by a predetermined voltage or more, in step S80, the stack main relay R1 is opened.

Then, in step S90, the first resistor relay R2 is closed for consuming the stack remaining voltage, and in step S100, whether or not the stack voltage V1 becomes equal to or less than a first reference voltage is determined, and in step S110, when it is determined that the stack voltage V1 is equal to or less than the first reference voltage, the second resistor relay R3 is also closed for consuming the stack remaining voltage.

In the above step, in step S120, whether or not the stack voltage V1 is equal to or less than a second reference voltage that is lower than the first reference voltage is determined, and in step S130, when it is determined that the stack voltage V1 is equal to or less than the second reference voltage, the first resistor relay R2 is opened, and in step S140, the second resistor relay R3 remains closed. In addition, a battery relay R4 is opened so that shutting down operation of the fuel cell vehicle is completed.

In this way, when shutting down the system of the fuel cell vehicle, the present disclosure opens the stack main relay R1 while the voltage V2 at the rear end of the stack main relay R1 is controlled to be higher than the stack voltage V1, and thus fusion and damage of the stack main relay R1 may be prevented.

In addition, before consuming the stack remaining energy by using the resistor 7, the high voltage battery 3 is maximally charged by using the remaining energy of the fuel cell stack 1, thus fuel economy performance is improved.

In addition, when consuming the remaining energy of the fuel cell stack 1 by using the resistor 7, timings when the first resistor relay R2 and the second resistor relay R3 are closed/opened are properly controlled according to the remaining voltage of the fuel cell stack 1 so that generation of inrush current when closing or opening the first resistor relay R2 and the second resistor relay R3 is prevented, and thus fusion damage of the corresponding relay is prevented.

However, in the present disclosure, in a situation where an operation of the vehicle is shut down by an emergency situation such as a vehicle collision or interlock (detaching of a high voltage connector), a high voltage safety regulation is satisfied by controlling the vehicle to enter a process of maximally rapidly consuming the stack voltage V1 by using a sequence of a conventional method even with damages of the relays.

While the present disclosure has been described in detail only with reference to the above specific examples, those skilled in the art will appreciate that various modifications, additions and substitutions are possible, without departing from the scope and spirit of the invention as disclosed in the accompanying claims.

What is claimed is:

1. A method of shutting down operation of a fuel cell vehicle, the method comprising:
   an air supply blocking step of blocking, by a controller, an air supply to a fuel cell stack when an operation shutting down command of the fuel cell vehicle is applied;
   a voltage raising step of increasing, by the controller, a voltage at a rear end of a stack main relay connected to the fuel cell stack such that the voltage at the rear end of the stack main relay is higher than a voltage at the fuel cell stack; and
   a stack voltage blocking step of opening, by the controller, the stack main relay when the voltage at the rear end of the stack main relay is higher than a stack voltage by a predetermined voltage or more.

2. The method of claim 1, further comprising:
   before the voltage raising step, a voltage dropping step of dropping the voltage at the rear end of the stack main relay in a predetermined slope when the voltage at the rear end of the stack main relay exceeds a voltage of a high voltage battery; and
   a charging step of charging the high voltage battery by using a remaining voltage of the fuel cell stack when dropping the voltage at the rear end of the stack main relay.

3. The method of claim 2, further comprising:
   a voltage dropping stop step of stopping of the dropping the voltage at the rear end of the stack main relay when the voltage at the rear end of the stack main relay reaches a sum of the voltage of the high voltage battery and a first margin voltage,
   wherein when the stack voltage reaches a voltage in which the voltage at the rear end of the stack main relay and a second margin voltage are added together, the voltage raising step is performed so that the voltage at the rear end of the stack main relay increases.

4. The method of claim 1, further comprising, after the stack voltage blocking step, a remaining voltage consuming step of consuming a remaining voltage of the fuel cell stack by closing a resistor relay connected between the fuel cell stack and a resistor.

5. The method of claim 4, wherein the remaining voltage consuming step includes:
   closing a first resistor relay connected between the fuel cell stack and the resistor;
   closing a second resistor relay connected between the fuel cell stack and the resistor when the stack voltage is equal to or less than a first reference voltage; and
   opening the first resistor relay when the stack voltage is equal to or less than a second reference voltage that is lower than the first reference voltage.

* * * * *